Figure 1:
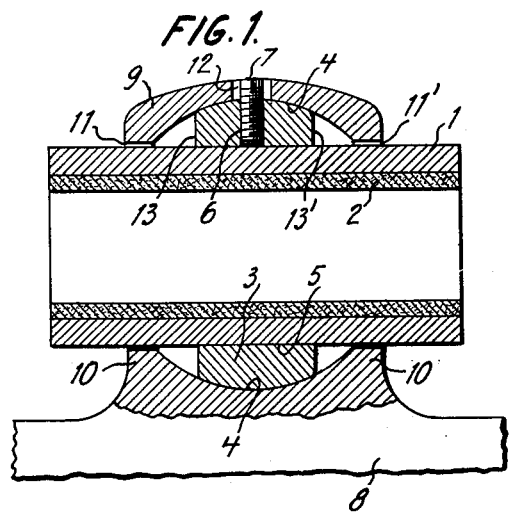

Dec. 8, 1964     M. SCOTT     3,160,449

SELF-ALINING BEARINGS

Filed Dec. 28, 1961

INVENTOR.
MARTIN SCOTT

BY

ATTORNEYS.

United States Patent Office 3,160,449
Patented Dec. 8, 1964

3,160,449
SELF-ALINING BEARINGS
Martin Scott, Valhalla, N.Y., assignor to Metallized Carbon Co., Inc., Ossining, N.Y., a corporation of New York
Filed Dec. 28, 1961, Ser. No. 162,666
4 Claims. (Cl. 308—72)

The present invention is directed to a self-lubricating, self-aligning sleeve type bearing structure to replace present ball bearing structures which, due to inherent characteristics, cannot perform satisfactorily due to extremes in operating conditions, such as high temperatures, solvent type vapor conditions or being submerged in liquids which deteriorate the lubricants, causing the present type ball bearings to fail in service.

This type of self-aligning ball bearing unit has gained wide acceptance in industry and is, therefore, found on many machines, conveyors, etc. In many cases machines that have operated satisfactorily in the past have been called upon to operate at higher temperatures, heavier loads, or other conditions detrimental to the original ball bearings. The changeover to a self-lubricating sleeve type bearing is generally a very expensive operation; in many cases requiring changes in the machine structure to accommodate sleeve bearing structures with different mounting dimensions. Being able to remove the present ball bearing structure from its present housing and inserting the proposed sleeve bearing structure in its place has advantages which can readily be seen by anyone familiar with bearing problems of this nature.

Other sleeve bearing structures exist which are self-aligning but are far more complicated, more expensive to manufacture and do not have all the desirable features of the present invention. The length of a one-piece-sleeve bearing structure is governed by the diameter of the openings in the housing through which the bearing is inserted in actual practice. It has been found that this short length is generally inadequate for a sleeve type bearing that will perform satisfactorily.

The present invention is adapted to overcome the disadvantages inherent in bearing structures of the type described, it being among the objects of the present invention to provide a bearing having a simple construction, which is inexpensive to produce, which is sturdy and efficient in operation.

It is also among the objects of the present invention to provide a structure to permit the use of sleeve bearings of indefinite length in order to carry various loads and enjoy still the advantages of this simple type of self-aligning bearing housing.

It is further among the objects of the present invention to provide a bearing which may be readily assembled and which may be easily dismantled for replacement of elements or for repairs.

In practicing the present invention, there is provided a hanger having a suitable support and a housing secured thereto, or preferably integral therewith. The housing is annular and the inner face thereof is arched so that it has a spherical surface. The ends of the housing have circular openings for the accommodation of a bearing and the sleeve in which it is mounted.

Within the housing is a ring surrounding the sleeve and having a radially placed set screw passing through the ring and bearing on the sleeve. The surface of the ring is a section of a sphere of substantially the same diameter as that of the housing. An aperture in the housing permits the insertion of the set screw and the tightening thereof against the sleeve. The length of the set screw is such that when it is in operative position, the head thereof is contained within the thickness of the housing. The aperture in which the set screw is mounted is of larger diameter than the head thereof. Similarly the diameter of the openings in the housing is greater than the diameter of the sleeve. Thereby sufficient play is provided so that the bearing may become self-alining.

Figure 2:
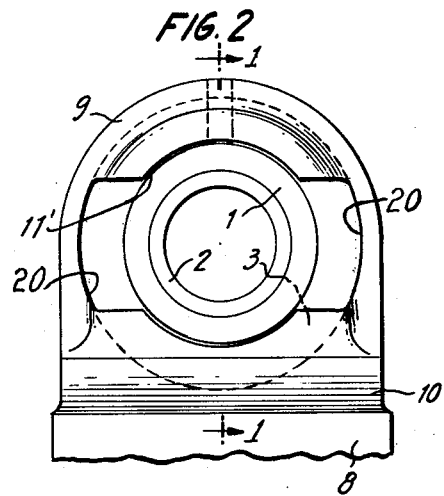
Figure 3:
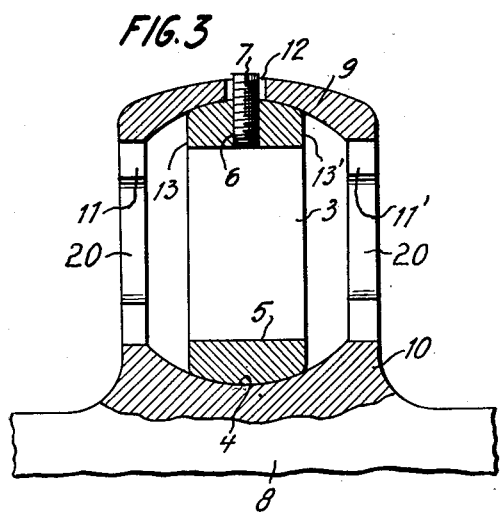
Figure 4:
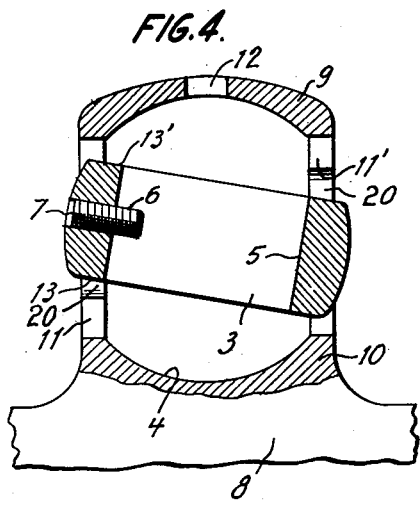

In the accompanying drawings constituting a part hereof, in which like reference characters indicate like parts,
FIG. 1 is a longitudinal vertical cross-sectional view through the self-alining bearing and showing all the elements in operative position taken along line 1—1 of FIG. 2;
FIG. 2 is a side elevational view thereof;
FIG. 3 is a view similar to FIG. 1, showing the sleeve and bearing removed from the assembly; and
FIG. 4 is a view similar to FIG. 3 and showing the ring rotated into such a position as to be readily removed from the housing or support.

There is provided a cylindrical sleeve 1 having a bearing 2 which is preferably an oilless type and consists of metallized graphite. Ring 3 has its outer surface arched, as shown at 4, and the inner surface cylindrical, as shown at 5, to contact sleeve 1. A headless screw 6 having a slotted end 7 passes through ring 3 and bears against sleeve 1. Base 8 of the hanger may be of any suitable design and is adapted to be mounted in fixed position. A housing 10 integral with support 8 has its inner surface 9 arched to conform with the arcuate face 4 of ring 3. Openings 11 and 11' in housing 10 have diameters slightly greater than the diameter of sleeve 1. Opening 12 in housing 10 is of a somewhat greater diameter than head 7 of screw 6. Sides 13 and 13' of ring 3 are in substantially parallel planes, and the axial thickness, or the distance between the plane ends of the ring, is less than the diameter of the spherical portion of the interior of the housing 9.

The bearing structure in its complete and operative form is shown in FIG. 1. When it is desired to dismantle the bearing for purpose of repair or replacement, set screw 6 is retracted, allowing sleeve 1 to be removed endwise. This is accomplished without the necessity of disturbing the shafting. The sleeve may be of such a construction that there is a split therein, enabling it to be removed from the shafting and to be replaced by a new bearing or sleeve.

As shown in FIG. 3, if it is desired to remove ring 3, set screw 6 is threaded inwardly a sufficient distance so that its split end is brought below the outer surface of the ring and as to become clear of the body of housing 10. Then it is rotated as shown in FIG. 4, whereby it clears the housing and it may be removed endwise through opening 11 to free it from the housing. In order to permit the ring 3 to be removed from within the housing as above described, the housing is provided with diametrically-opposite notches 20 in the edge of one or both of the openings 11 and 11'. Thus, when the ring is turned so that its axis is at substantially right angles to the axis of the notched opening or openings, it can be removed bodily from inside of the housing through the notched opening.

There are a number of advantages inherent in the present structure. Because of openings 11 and 11' and aperture 12, there is sufficient freedom of movement of the sleeve relative to the housing to take up any normal inaccuracies in the shafting or mountings of the bearing. The structure is simple and inexpensive. The assembly and the disassembly thereof are very easy and they do not require any highly skilled mechanics for so doing. The bearing is sturdy in construction and ordinarily only bearing 2 need be replaced even after long usage.

What is claimed is:

1. A self-alining bearing comprising, a support, an annular housing for a bearing on said support, the interior of the housing being largely spherical, a ring within the housing having an arcuate outer surface in direct bearing contact with said interior and having flattened ends, the axial thickness of the ring between said flattened ends being less than the diameter of the spherical interior part of the housing, the housing having central openings, at least one of said openings being enlarged so that when the ring is disposed in the housing with its axis at an angle to the axis of the housing, the ring can be removed from within the housing by way of the enlarged opening, a sleeve extending through the ring, a threaded opening on a side of said ring passing completely thru said ring, said opening being radial and transverse to the axis of said ring, a corresponding hole passing thru said spherical portion of said housing centrally thereof and of larger diameter than said opening and in alinement with said ring when in operative position, and a set screw of greater lengths than the thickness of said ring extending through the housing and through the ring and engaging against the sleeve, said set screw extending at least into said hole.

2. A bearing according to claim 1, wherein the housing has an aperture in alinement with the set screw and through which the set screw passes, the set screw being headless so that it can be threadably moved through the ring to bring its top end below the arcuate outer surface of the ring to permit the ring to be pivotally swung to a position in which it can be removed from within the housing.

3. A self-alining bearing comprising, a support, an annular housing for a bearing on the support, the interior of the housing being largely spherical, a ring located within the housing and provided with an arcuate outer surface and flattened ends, the distance between said flattened ends being less than the diameter of the spherical interior portion of the housing, the housing having central openings, at least one of the openings being formed with diametrically-arranged notches, each of the notches being wider than the distance between the flattened ends of the ring so that when the ring is disposed in the housing with its axis at an angle to the openings, the ring can be bodily moved out of the notched opening, a sleeve extending through the ring, a headless set screw extending through the ring and engaging the sleeve, and the housing having an aperture through which the set screw can be threadably moved.

4. A bearing according to claim 1 characterized in that the enlargement of one of the openings is formed by notches, the width of said ring being such that in the absence of said sleeve said ring may be twisted for removal through said notched opening.

References Cited by the Examiner

UNITED STATES PATENTS

| | | | |
|---|---|---|---|
| 1,321,417 | 11/19 | Carlborg | 308—194 |
| 1,540,072 | 6/25 | Howes | 308—29 |
| 1,562,130 | 11/25 | Stitzinger | 308—72 |
| 1,853,727 | 4/32 | Franks | 308—72 |
| 2,423,684 | 7/47 | Collito | 308—72 |
| 2,543,905 | 3/51 | Firth | 308—194 X |
| 2,612,788 | 10/52 | Christian | 308—194 X |
| 2,827,340 | 3/58 | Johnson | 308—72 |
| 3,001,841 | 9/61 | Glavan et al. | 308—72 X |

FRANK SUSKO, *Primary Examiner.*

MILTON KAUFMAN, ROBERT C. RIORDON,
*Examiners.*